(12) United States Patent   (10) Patent No.: US 6,640,917 B2
Maruyama                    (45) Date of Patent:    Nov. 4, 2003

(54) POWER TRANSMISSION MECHANISM

(75) Inventor: Taiji Maruyama, Saitama-ken (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 183 days.

(21) Appl. No.: 09/973,001

(22) Filed: Oct. 10, 2001

(65) Prior Publication Data
US 2002/0040818 A1 Apr. 11, 2002

(30) Foreign Application Priority Data
Oct. 11, 2000 (JP) ........................... 2000-310520

(51) Int. Cl.$^7$ ............................................. B60K 17/04
(52) U.S. Cl. ...................... 180/65.6; 180/65.2; 74/473.1
(58) Field of Search ................. 180/65.6, 65.2, 180/65.3, 65.7, 65.8; 74/473.1, 665 B, 665 A, 665 Q, 661, 475

(56) References Cited

U.S. PATENT DOCUMENTS

| 5,513,719 | A | * | 5/1996 | Moroto et al. | ............ | 180/65.4 |
| 5,562,565 | A | * | 10/1996 | Moroto et al. | ............ | 477/3 |
| 5,887,670 | A | * | 3/1999 | Tabata et al. | ............ | 180/65.2 |
| RE36,678 | E | * | 5/2000 | Moroto et al. | ............ | 180/65.4 |
| 6,269,895 | B1 | * | 8/2001 | Tanuguchi et al. | ......... | 180/65.2 |
| 6,341,541 | B1 | * | 1/2002 | Sakamoto et al. | ........ | 74/665 A |
| 6,502,652 | B2 | * | 1/2003 | Rogg | ........................ | 180/65.2 |
| 6,551,208 | B1 | * | 4/2003 | Holmes et al. | ............ | 475/5 |
| 2001/0050190 | A1 | * | 12/2001 | Takenaka | ................... | 180/65.2 |

FOREIGN PATENT DOCUMENTS

JP  6-174055  * 6/1994 ........... F16H/57/02

* cited by examiner

Primary Examiner—Brian L. Johnson
Assistant Examiner—J. Allen Shriver
(74) Attorney, Agent, or Firm—Armstrong, Westerman & Hattori, LLP

(57) ABSTRACT

A power transmission mechanism which is capable of employing one electric motor as a drive source for driving drive wheels and as a drive source for cranking an engine, thereby making it possible to reduce manufacturing costs of the hybrid vehicle, and preventing the motor from offering an extra rotational resistance to the engine when the drive wheels are being driven by the engine, thereby making it possible to enhance fuel economy. In the power transmission mechanism for transmitting the driving force from the engine and/or the electric motor to the drive wheels, when a synchro-clutch for the electric motor, driven by a switching actuator, connects the drive shaft of the electric motor and a driving drive shaft gear to each other, the electric motor is connected to the drive wheels via a meshing gear pair (driving drive shaft gear and driving output shaft gear), whereas when the synchro-clutch connects the drive shaft of the electric motor and a cranking drive shaft gear to each other, the electric motor is connected to the engine via a meshing gear pair (cranking drive shaft gear and cranking input shaft gear), the input shaft of the transmission, and a clutch.

5 Claims, 8 Drawing Sheets

F I G. 1
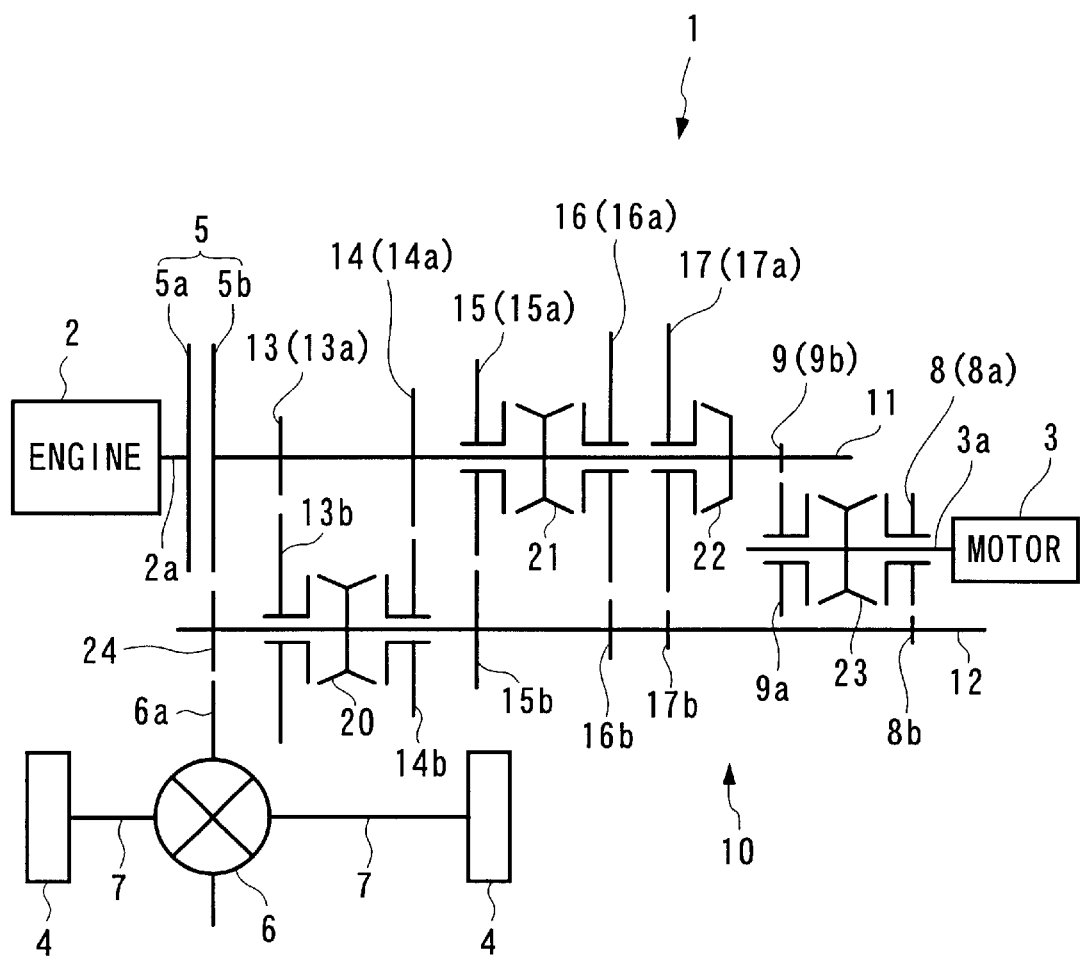

POWER TRANSMISSION MECHANISM

BACKGROUND OF THE INVENTION

1. Field of the Invention

This invention relates to a power transmission mechanism for transmitting a driving force from at least one of an engine and an electric motor to drive wheels.

2. Description of the Prior Art

Conventionally, a power transmission mechanism of this kind has been proposed e.g. by Japanese Laid-Open Patent Publication (Kokai) No. 11-69509, which includes a multi-stage transmission for connecting an engine to a differential gear, and a clutch for connecting and disconnecting the multi-stage transmission to and from the engine. The multi-stage transmission has an output shaft directly connected to the drive shaft of a motor for driving drive wheels. When the power transmission mechanism performs a shifting operation during running of the vehicle being driven by the engine, the motor drives the output shaft of the multi-stage transmission immediately after disengagement of the clutch, thereby preventing occurrence of a sense of loss of a driving force during running of the vehicle (hereinafter referred to as an "idle running feeling"). Further, the motor performs regeneration during deceleration of the engine. The engine has a crankshaft thereof connected to an auxiliary machine-driving motor via an electromagnetic clutch and a belt transmission mechanism. This auxiliary machine-driving motor drives auxiliary machines, such as an air-conditioner compressor and the like, during stoppage of the engine.

For a hybrid vehicle incorporating the above conventional power transmission mechanism, at least two motors, that is, a motor for driving drive wheels and a motor for driving auxiliary machines are necessitated. In addition thereto, if a starter motor for starting the engine is separately provided, still another electric motor is necessitated, which leads to increased manufacturing costs of the vehicle and makes it difficult to secure a space for installing the mechanism in the vehicle. Further, since the motor for driving the drive wheels has a drive shaft thereof directly connected to the output shaft of the transmission, a relatively large torque is required to drive the drive wheels. This necessarily leads to an increased size of the motor, resulting in further increased manufacturing cost of the mechanism. Further, for the same reason, the drive wheel-driving motor offers an extra rotational resistance to the engine except when the drive wheels are being driven or the regeneration is being carried out. This results in degraded fuel economy.

SUMMARY OF THE INVENTION

It is an object of the invention to provide a power transmission mechanism for an automotive vehicle, which is capable of employing one electric motor as a drive source for driving drive wheels and as a drive source for starting an engine, thereby making it possible to reduce manufacturing costs of the vehicle, and preventing the motor from offering an extra rotational resistance when the drive wheels are being driven by the engine, thereby making it possible to improve fuel economy.

To attain the above object, the present invention provides a power transmission mechanism that connects at least one of an engine and an electric motor to drive wheels, thereby transmitting a driving force from the at least one of the engine and the electric motor to the drive wheels.

The power transmission mechanism according to the invention is characterized by comprising:

a multi-stage transmission including an input shaft connected to the engine and an output shaft connected to the drive wheels, the input shaft and the output shaft having a plurality of change gears arranged thereon which are selectively caused to mesh with each other, thereby transmitting the driving force from the engine to the drive wheels, such that a transmission gear ratio can be stepwise changed and at the same time the input shaft and the output shaft can be disconnected from each other, the multi-stage transmission having an input shaft gear and an output shaft gear fitted on the input shaft and the output shaft, respectively;

a drive shaft driven by the electric motor;

a first gear and a second gear arranged on the drive shaft; and a switching mechanism for selectively switching a connection mode of the electric motor between an output shaft connection mode in which the electric motor is connected to the output shaft by meshing of the first gear with the output shaft gear, and an input shaft connection mode in which the electric motor is connected to the input shaft by meshing of the second gear with the input shaft gear.

According to this power transmission mechanism, the plurality of change gears selectively mesh with each other, whereby the driving force from the engine is transmitted to the drive wheels according to a transmission gear ratio between the meshed change gears, whereby the hybrid vehicle is driven for traveling. Further, when the connection mode of the electric motor is switched to the output shaft connection mode by the switching mechanism, the electric motor is connected to the output shaft via the first gear and the output shaft gear meshing with each other, and thereby connected to the drive wheels. As a result, the electric motor can be used as a drive source for driving the drive wheels, and even if the power transmission mechanism undergoes a shifting operation during running of the vehicle, the drive wheels can be driven by the electric motor, whereby it becomes possible to prevent occurrence of an idle running feeling. Further, when the connection mode is switched to the input shaft connection mode by the switching mechanism, the electric motor is connected to the input shaft via the second gear and the input shaft gear meshing with each other, and thereby connected to the engine. Consequently, when the output shaft and the input shaft are disconnected from each other during stoppage of the engine, it is possible to crank the engine by the electric motor. This enables the electric motor to be used as a starter motor. As described above, one electric motor can be employed as the drive source for driving drive wheels and as the drive source for cranking the engine, which not only makes it possible to reduce manufacturing costs of the vehicle but also makes it easy to secure a space for mounting the transmission mechanism in a hybrid vehicle. Further, since the electric motor has the first gear or the second gear meshing with the gear of the transmission, by exploiting gear ratios between these gears, the drive wheels can be driven with a torque smaller than that of the conventional electric motor which is directly connected to the output shaft of the transmission. This makes it possible to design the electric motor compact in size, thereby making it easy to secure a mounting space of the transmission mechanism in the vehicle.

Preferably, the input shaft gear is formed by an input shaft integrated gear integrally formed with the input shaft and an input shaft idle gear rotatable about the input shaft, the output shaft gear being integrally formed with the output shaft, the switching mechanism switching the connection mode of the electric motor to the output shaft connection mode by causing the first gear to mesh with the output shaft gear via the input shaft idle gear, and switching the connection mode to the input shaft connection mode by causing the second gear to mesh with the input shaft integrated gear.

According to this preferred embodiment, when the connection mode is switched to the output shaft connection mode by the switching mechanism, the first gear meshes with the output shaft gear via the input shaft idle gear, whereby the drive wheels are driven by the electric motor. Further, in the input shaft connection mode, the second gear meshes with the input shaft integrated gear, whereby the engine is cranked by the electric motor. In this case, generally, the transmission includes idle gears rotatable about the input shaft and the output shaft, and integrated gears as change gears, and hence if such existing change gears are employed as input shaft idle gears, input shaft integrated gears, and output shaft gears, the above effects can be obtained without adding extra gears other than the change gears. Further, since the electric motor and the drive shaft thereof can be arranged in parallel with the gear shafts of the transmission, lengths in the axial direction, such as the lengths of the input shaft and so forth, can be reduced as a whole, thereby ensuring excellent mounting performance of the hybrid vehicle.

Preferably the input shaft gear is integrally formed with the input shaft, the output shaft gear being formed by an output shaft integrated gear integrally formed with the output shaft and an output shaft idle gear rotatable about the output shaft, the switching mechanism switching the connection mode of the electric motor to the output shaft connection mode by causing the first gear to mesh with the output shaft integrated gear, and switching the connection mode to the input shaft connection mode by causing the second gear to mesh with the input shaft gear via the output shaft idle gear.

According to this preferred embodiment, in the output shaft connection mode, the first gear meshes with the output shaft integrated gear, whereby the drive wheels are driven by the electric motor. Further, in the input shaft connection mode, the second gear meshes with the input shaft gear via the output shaft idle gear, whereby the engine is cranked by the electric motor. Further, for the same reason as described hereinabove, the above advantageous effects can be obtained without adding extra gears, and lengths in the axial direction, such as the lengths of the input shaft and so forth, can be reduced as a whole, thereby ensuring excellent mounting performance of the hybrid vehicle.

Preferably, the switching mechanism is capable of further switching the connection mode of the electric motor to a cut-off mode in which the electric motor is disconnected from both the output shaft and the input shaft.

According to this preferred embodiment, when the connection mode is switched to the cut-off mode, the electric motor is disconnected from the output shaft and the input shaft, so that it is possible to prevent the electric motor from offering an extra rotational resistance when the drive wheels are being driven by the engine, thereby making it possible to enhance fuel economy.

Preferably, the electric motor is capable of performing regeneration operation, the transmission further including a reverse gear capable of simultaneously meshing with one of the change gears of the input shaft and one of the change gears of the output shaft, the transmission mechanism further including a clutch for disconnecting the transmission from the engine when the reverse gear simultaneously meshes with the one of the change gears of the input shaft and the one of the change gears of the output shaft, and the switching mechanism switches the connection mode of the electric motor to the input shaft connection mode, in a state in which the transmission and the engine are disconnected from each other by the clutch.

According to this preferred embodiment, when the reverse gear simultaneously meshes with one of the change gears of the input shaft and one of the change gears of the output shaft, the switching mechanism switches the connection mode to the input shaft connection mode in a state in which the transmission and the engine are disconnected from each other by the clutch, whereby the electric motor and the input shaft are connected to each other. Therefore, the electric motor offers a rotational resistance to the input shaft to thereby reduce the rotation of the input shaft, and hence when the reverse gear is caused to simultaneously mesh with the one of the change gears of the input shaft and the one of the change gears of the output shaft so as to change the traveling mode of the vehicle from a forward one to a backward one, the rotation of the input shaft is reduced by inertia of energy, and the reverse gear in a stopped state is caused to mesh with the one of the change gears of the input shaft whose rotation is reduced. This makes it possible to prevent occurrence of a gear squeal. In this case, if the regeneration operation by the electric motor is additionally carried out, the rotation of the engine can be reduced in a shorter time period, whereby it is possible to prevent occurrence of a gear squeal, and recover regenerative electric power at the same time.

The above and other objects, features, and advantages of the invention will become more apparent from the following detailed description taken in conjunction with the accompanying drawings.

BRIEF DESCRIPTION OF THE DRAWINGS

FIG. 1 is a block diagram schematically showing the arrangement of a hybrid vehicle to which is applied a power transmission mechanism according to an embodiment of the invention;

DETAILED DESCRIPTION OF A PREFERRED EMBODIMENT

Figure 2:
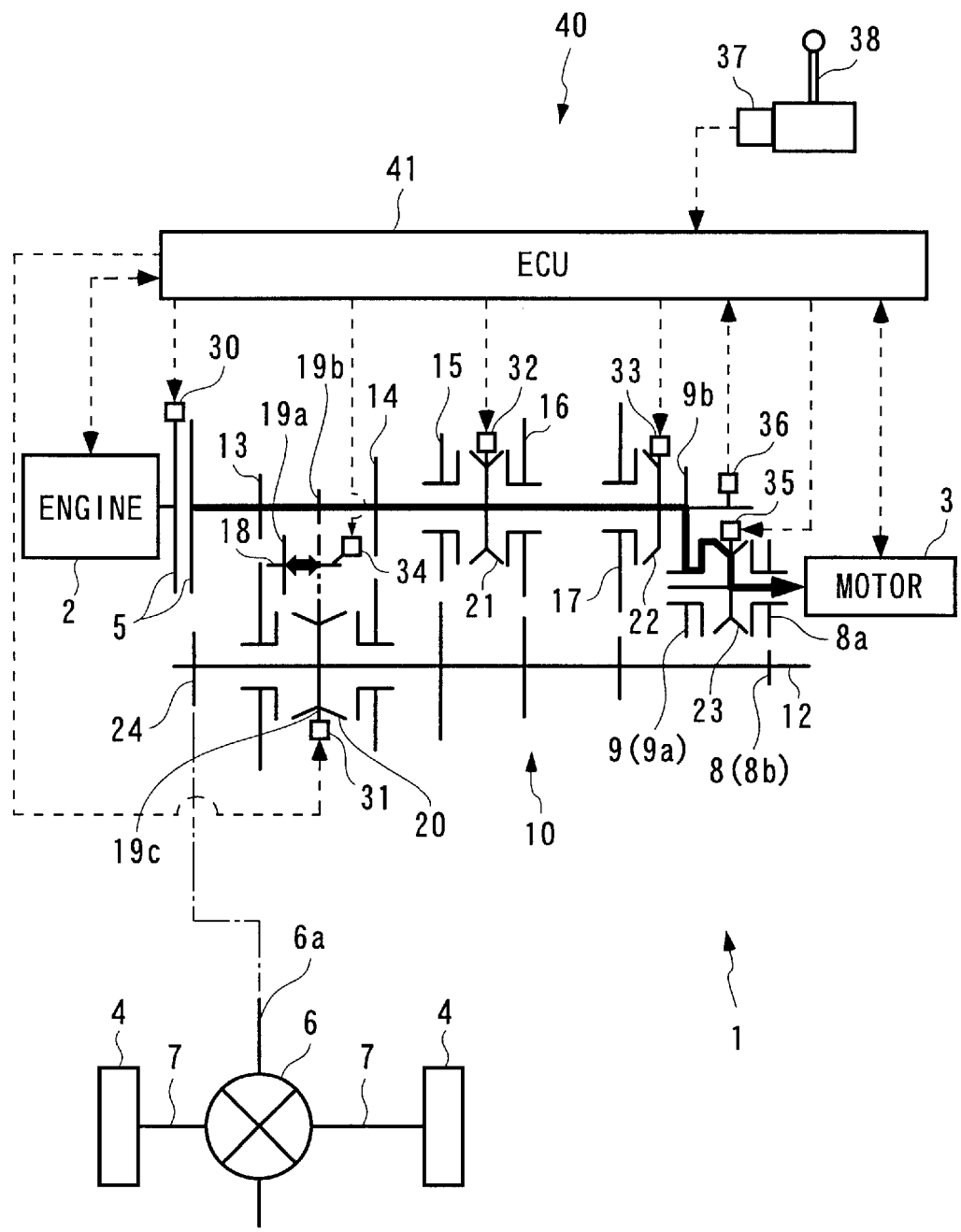
FIG. 2 is block diagram schematically showing the arrangement of a control system of the power transmission mechanism.

The invention will now be described in detail with reference to the drawings showing a power transmission mechanism according to an embodiment thereof. FIG. 1 schematically shows the arrangement of a hybrid vehicle to which is applied the power transmission mechanism according to the present embodiment. FIG. 2 schematically shows the arrangement of a control system for controlling the power transmission mechanism, with devices and parts added to the FIG. 1 power transmission mechanism. The power transmission mechanism 1 is capable of selectively connecting an engine 2 and an electric motor (hereinafter referred to as the "motor") 3, both of which are mounted in a hybrid vehicle, not shown, to drive wheels 4, 4, and includes a clutch 5, a transmission 10, a differential 6, drive shafts 7, 7, etc. The engine 2 is mechanically connected to the drive wheels 4, 4 via the clutch 5, the transmission 10, the differential 6, and the drive shafts 7, 7. The motor 3 is mechanically connected to the drive wheels 4, 4 via the transmission 10, the differential 6, and the drive shafts 7, 7.

The clutch 5 includes a clutch plate 5a coupled to a crankshaft 2a of the engine 2, and a clutch plate 5b which is a counterpart plate of the clutch plate 5a, and coupled to an input shaft 11 of the transmission 10. The clutch 5 has an actuator 30 therefor connected thereto. This actuator 30 for the clutch 5 is electrically connected to an ECU 41, referred to hereinafter, of the control system 40, and causes the clutch 5 to connect and disconnect between the engine 2 and the transmission 10 under the control of the ECU 41.

The transmission 10 is of a type whose shifting operations are controlled by the ECU 41 that drives actuators 31 to 34 for the transmission 10, as described hereinafter. The transmission 10 includes an input shaft 11 which is a main shaft, an output shaft 12 which is a counter shaft, gear pairs 13 to 17 for the forward first to fifth speed shifts (hereinafter referred to as the first to fifth speed gear pairs 13 to 17), a reverse gear shaft 18 (see FIG. 5), a reverse gear train 19 (see FIG. 5) and so forth. The above input shaft 11, output shaft 12 and reverse gear shaft 18 are arranged in parallel with each other.

The first to fifth speed gear pairs 13 to 17 are set to different gear ratios from each other. Further, the gear pairs 13 to 17 are comprised of input-side forward first to fifth speed gears 13a to 17a (change gears) fitted on the input shaft 11, respectively, and output-side forward first to fifth speed gears 13b to 17b (change gears) fitted on the output shaft 12, respectively. Each pair of the speed gears always mesh with each other.

Out of the above speed gears, the input-side forward first and second speed gears 13a to 14a are integrally formed with the input shaft 11, respectively. On the other hand, the output-side forward first and second speed gears 13b to 14b are formed by idle gears rotatable about the output shaft 12, and connected to or disconnected from the output shaft 12 by a first/second speed synchro-clutch 20, respectively. This first/second speed synchro-clutch 20 is coupled to the first/second speed actuator 31. The first/second speed actuator 31 is electrically connected to the ECU 41 under the control of which the actuator 31 selectively connects one of the output-side forward first speed gear 13b and the output-side forward second speed gear 14b to the output shaft 12 via the first/second speed synchro-clutch 20, or alternatively simultaneously disconnect both of the gears 13b, 14b from the output shaft 12. Thus, the input shaft 11 and the output shaft 12 are connected to or disconnected from each other by means of the forward first speed gear pair 13 or the forward second speed gear pair 14.

On the other hand, the input-side forward third and fourth speed gears 15a to 16a are formed by idle gears rotatable about the input shaft 11, while the output-side forward third and fourth speed gears 15b to 16b are integrally formed with the output shaft 12. Further, under the control of the ECU 41, the third/fourth speed actuator 32 selectively connects one of the input-side forward third speed gear 15a and the input-side forward fourth speed gear 16a to the input shaft 11 via a third/fourth speed synchro-clutch 21, or alternatively simultaneously disconnects both of the gears 15a, 16a from the input shaft 11. Thus, the input shaft 11 and the output shaft 12 are connected to or disconnected from each other by means of the forward third speed gear pair 15 or the forward fourth speed gear pair 16.

Similarly, the input-side forward fifth speed gear 17a as well is formed by an idle gear rotatable about the input shaft 11, and the output-side forward first to fifth speed gear 17b is integrally formed with the output shaft 12. Further, under the control of the ECU 41, the fifth speed actuator 33 causes a fifth speed synchro-clutch 22 to connect the input-side forward fifth speed gear 17a to the input shaft 11, or disconnect the gear 17a from the input shaft 11. Thus, the input shaft 11 and the output shaft 12 are connected to or disconnected from each other by means of the forward fifth speed gear pair 17.

Further, a drive shaft 3a driven by the motor 3 has a driving drive shaft gear 8a (first gear) and a cranking drive shaft gear 9a (second gear) fitted thereon. Similarly to the above gears 15a to 16a and the like, the driving drive shaft gear 8a and the cranking drive shaft gear 9a are formed by idle gears rotatable about the drive shaft 3a, and connected to or disconnected from the drive shaft 3a by a synchro-clutch 23 for use with the motor 3.

On the other hand, the input shaft 11 has a cranking input shaft gear 9b (input shaft gear) which forms a cranking gear pair 9 with the above cranking drive shaft gear 9a. This cranking input shaft gear 9b is integrally formed with the input shaft 11, and always meshes with the cranking drive shaft gear 9a. Further, the output shaft 12 has a driving output shaft gear 8b (output shaft gear) which forms a driving gear pair 8 with the above driving drive shaft gear 8a. This driving output shaft gear 8b as well is integrally formed with the output shaft 12, and always meshes with the driving drive shaft gear 8a.

Further, the synchro-clutch 23 for the motor 3 has a switching actuator 35 connected thereto. The switching actuator 35 as well, under the control of the ECU 41, selectively connects one of the driving drive shaft gear 8a and the cranking drive shaft gear 9a to the drive shaft 3a via the synchro-clutch 23, or alternatively simultaneously disconnects both of the gears 8a, 9a from the drive shaft 3a. Thus, the drive shaft 3a is connected to or disconnected from the output shaft 12 or the input shaft 11.

Further, the input shaft 11 is provided with an input shaft rotational speed sensor 36 which senses an input shaft rotational speed, and supplies a signal indicative of the sensed input shaft rotational speed, that is, a pulse signal corresponding to the rotation of the input shaft 11, to the ECU 41. The ECU 41 calculates the input shaft rotational speed Nm based on this signal.

On the other hand, the output shaft 12 is integrally formed with a connection gear 24. This connection gear 24 always meshes with the gear 6a of the above differential 6, whereby the drive wheels 4, 4 are driven for rotation via the differential 6 as the output shaft 12 rotates.

Further, the reverse gear train 19 is comprised of a first reverse gear 19a fitted to the reverse gear shaft 18, a second reverse gear 19b integrally formed with the input shaft 11, and a third reverse gear 19c integrally formed with the first/second speed synchro-clutch 20 of the output shaft 12. The first reverse gear 19a is fitted to the reverse gear shaft 18 by spline fitting. Thus, the first reverse gear 19a can rotate in unison with the reverse gear shaft 18, and axially slide between a meshing position (position indicated by a two-dot chain line in FIGS. 2 and 5) where the first reverse gear 19a simultaneously meshes with the second and third reverse gears 19b, 19c and a release position (position indicated by a solid line in FIGS. 2 and 5) where the meshing relation between the three gears is canceled.

Further, the reverse gear actuator 34 is coupled to the first reverse gear 19a. The reverse gear actuator 34, under the control of the ECU 41, causes the first reverse gear 19a to slide between the meshing position and the release position. In this embodiment, when the first reverse gear 19a is in the meshing position, the first reverse gear 19a simultaneously meshes with the second and third reverse gears 19b, 19c, whereby the input shaft 11 and the output shaft 12 are caused to rotate in directions reverse to each other.

Next, the control system 40 for controlling the above operations of the power transmission mechanism 1 will be described hereinafter. The control system 40 is comprised of the ECU 41, the actuators 30 to 35, described above, controlled by the ECU 41, the input shaft rotational speed sensor 36, a shift position sensor 37, and so forth. The shift position sensor 37 senses the shift position of a shift lever 38, and supplies a signal indicative of the sensed shift position to the ECU 41.

The ECU 41 is formed by a microcomputer including a RAM, a ROM, a CPU, and an I/O interface, none of which are shown. The ECU 41 drives the actuators 30 to 35 depending on the shift position sensed by the shift position sensor 37 to thereby control the shifting operation of the transmission 10. Further, as described hereinafter, the ECU 41 controls the operation of the power transmission mechanism 1 to thereby selectively switch the connection mode of the motor 3 to one of an output shaft connection mode for connecting the motor 3 to the output shaft 12, an input shaft connection mode for connecting the motor 3 to the input shaft 11, and a cut-off mode for disconnecting the motor 3 from both of the input shaft 11 and the output shaft 12.

In the following, the control process carried out by the control system 40 will be described in detail. First, an idle running feeling-preventing process will be descried based on a case in which the traveling speed of the vehicle is shifted from the forward first speed to the forward second speed by way of example. In the control system 40, when a shift position for any of the forward first to fifth speeds is selected by operation of the shift lever 38, the connection mode of the motor 3 is switched to the output shaft connection mode to operate the switching actuator 35, whereby the driving drive shaft gear 8a and the drive shaft 3a are connected to each other via the synchro-clutch 23. This causes the drive shaft 3a, that is, the motor 3, and the output shaft 12 to be connected to each other via the driving gear pair 8, and at the same time, the motor 3 is driven at a rotational speed which does not offer a rotational resistance.

Figure 3:
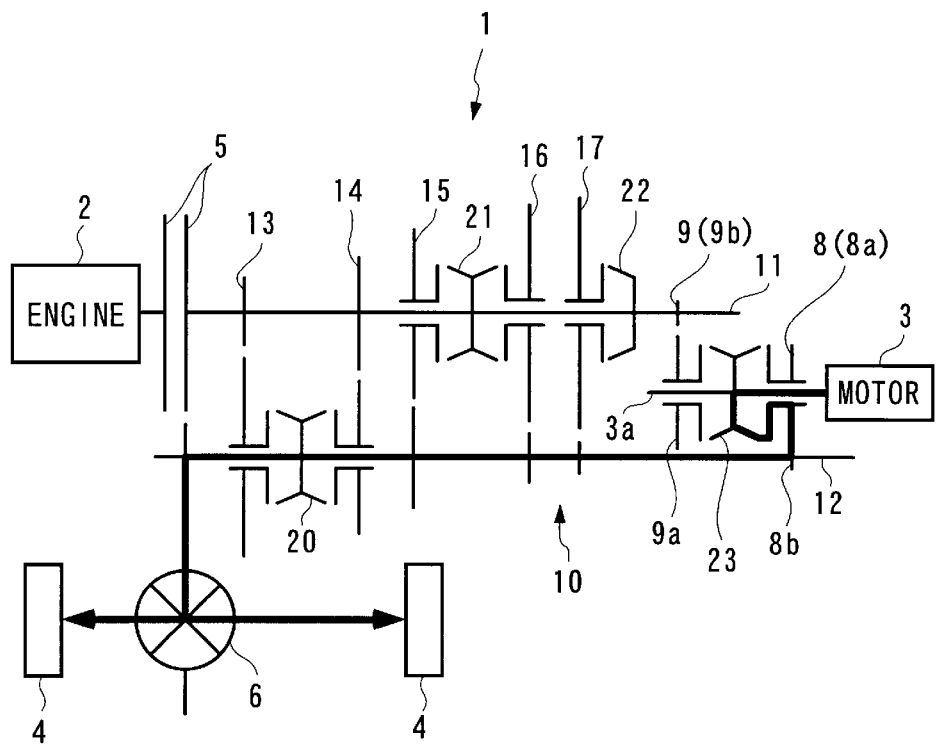
FIG. 3 is a diagram showing a power transmission path formed when the connection mode of an electric motor is switched to an output shaft connection mode during execution of an idle running feeling-preventing process.

When the vehicle is running at the forward first speed, if the shift lever 38 is operated from the first speed position to the second speed position, the clutch actuator 30 is operated whereby the engine 2 and the input shaft 11 are disconnected by the clutch 5, and at the same time the actuator 31 is operated whereby the forward first speed gear pair 13 are disengaged to cause the transmission 10 to be placed in a neutral gear state in which the input shaft 11 and the output shaft 12 are disconnected from each other. As described above, when the shifting operation is being carried out, as shown by arrows with wide lines in FIG. 3, a driving force from the motor 3 is transmitted to the drive wheels 4, 4 via the output shaft 12, the differential 6, and the drive shafts 7, 7. Thus, the driving force from the motor 3 is transmitted to the drive wheels 4, 4 in place of drive torque from the engine 2 so as to compensate for the drive torque from the engine 2 temporarily lost by disengagement of the clutch 5, so that it is possible to prevent an idle running feeling from being caused by the shifting operation. After that, when the actuator 31 is operated, the transmission 10 is switched from the neutral gear state to a state of the forward second speed gear pair 14 having meshed with each other, whereby the input shaft 11 and the output shaft 12 are connected to each other, and at the same time the clutch actuator 30 is operated, whereby the engine 2 is coupled to the input shaft 11.

Figure 4:
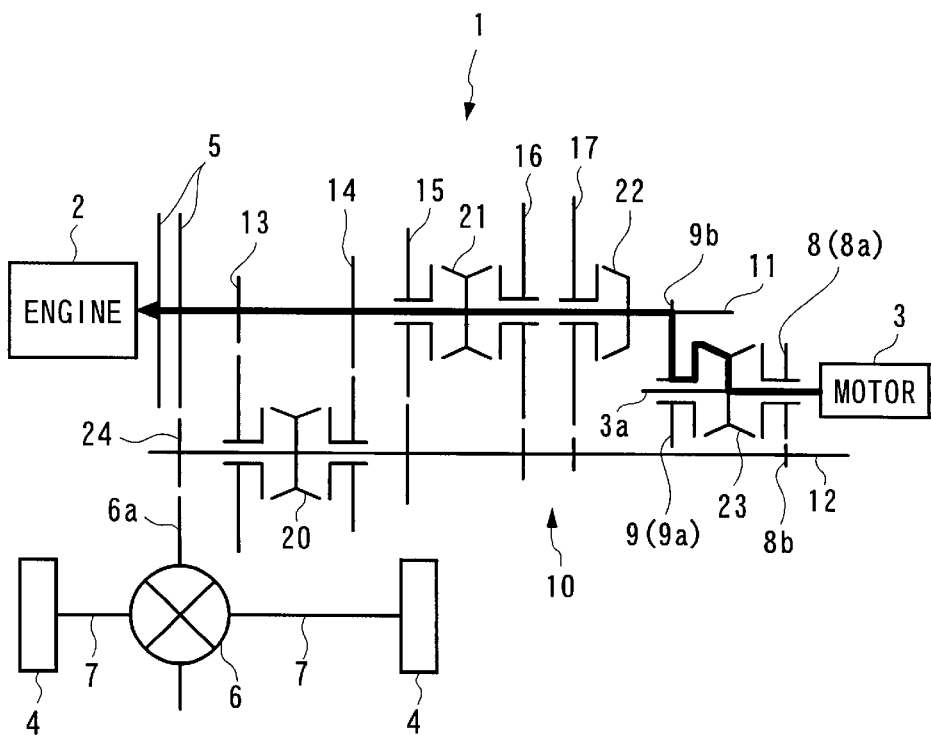
FIG. 4 is a diagram showing a power transmission path formed when the connection mode of the electric motor is switched to an input shaft connection mode to execute an engine starting process.

Next, a process for starting the engine 2 will be described hereinafter. First, when the engine 2 is to be stopped, the clutch actuator 30 is operated to disconnect the engine 2 and the input shaft 11 by the clutch 5, and simultaneously the connection mode of the motor 3 is switched to the input shaft connection mode to operate the switching actuator 35, whereby the cranking drive shaft gear 9a and the drive shaft 3a are connected to each other via the synchro-clutch 23. Thus, when the engine 2 is in stoppage, the engine 2 and the input shaft 11 are held in a disconcerted state, and at the same time the motor 3 and the input shaft 11 are held in a connected state. When an engine starting signal is input during stoppage of the engine 2, the clutch actuator 30 is operated to connect the engine 2 to the input shaft 11 via the clutch 5, and then the motor 3 is driven. As described above, as shown by an arrow with wide lines in FIG. 4, a driving force from the motor 3 is transmitted to the engine 2 via the input shaft 11, the clutch 5, and the crankshaft 2a, whereby the engine 2 can be cranked.

Figure 5:
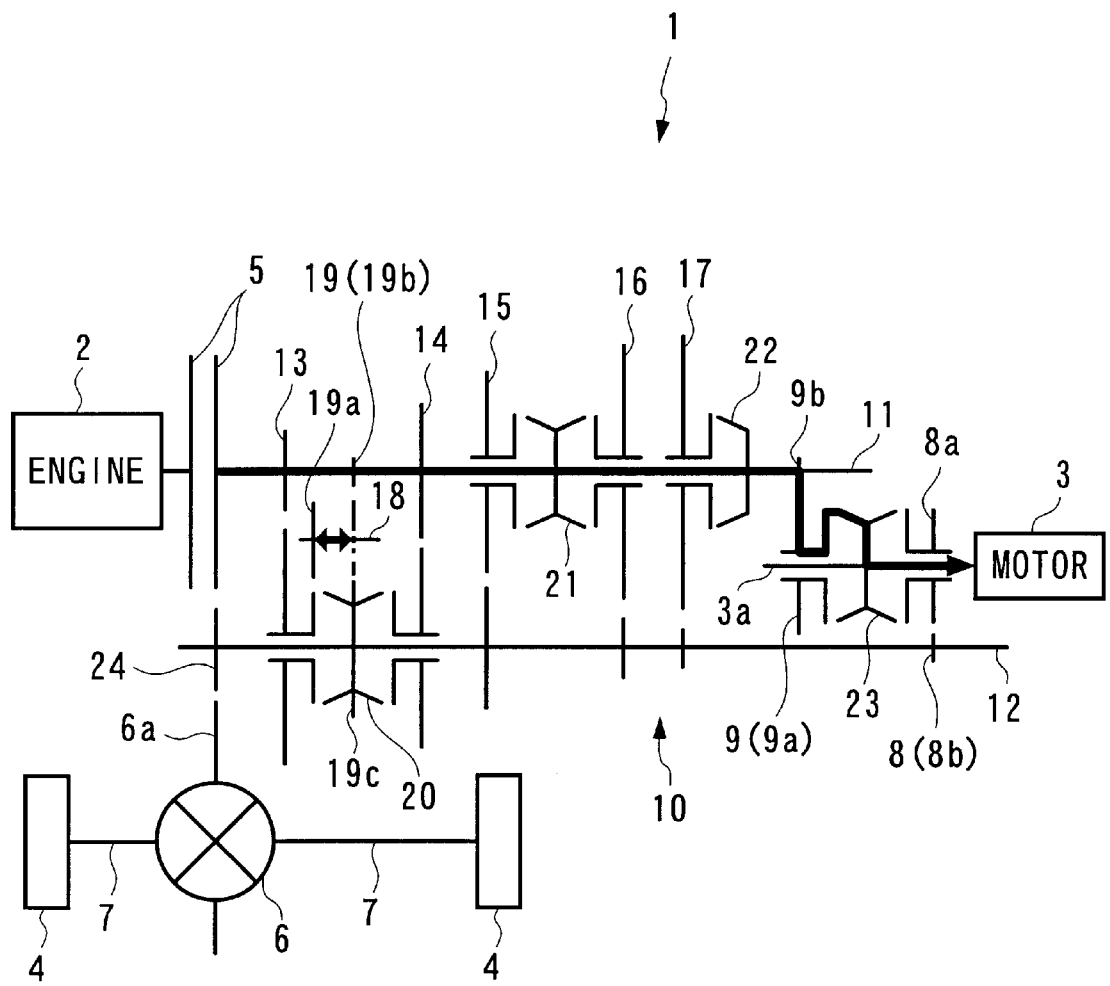
FIG. 5 is a diagram showing a power transmission path formed when the connection mode of the electric motor is switched to the input shaft connection mode during execution of a gear squeal prevention process.
Figure 6:
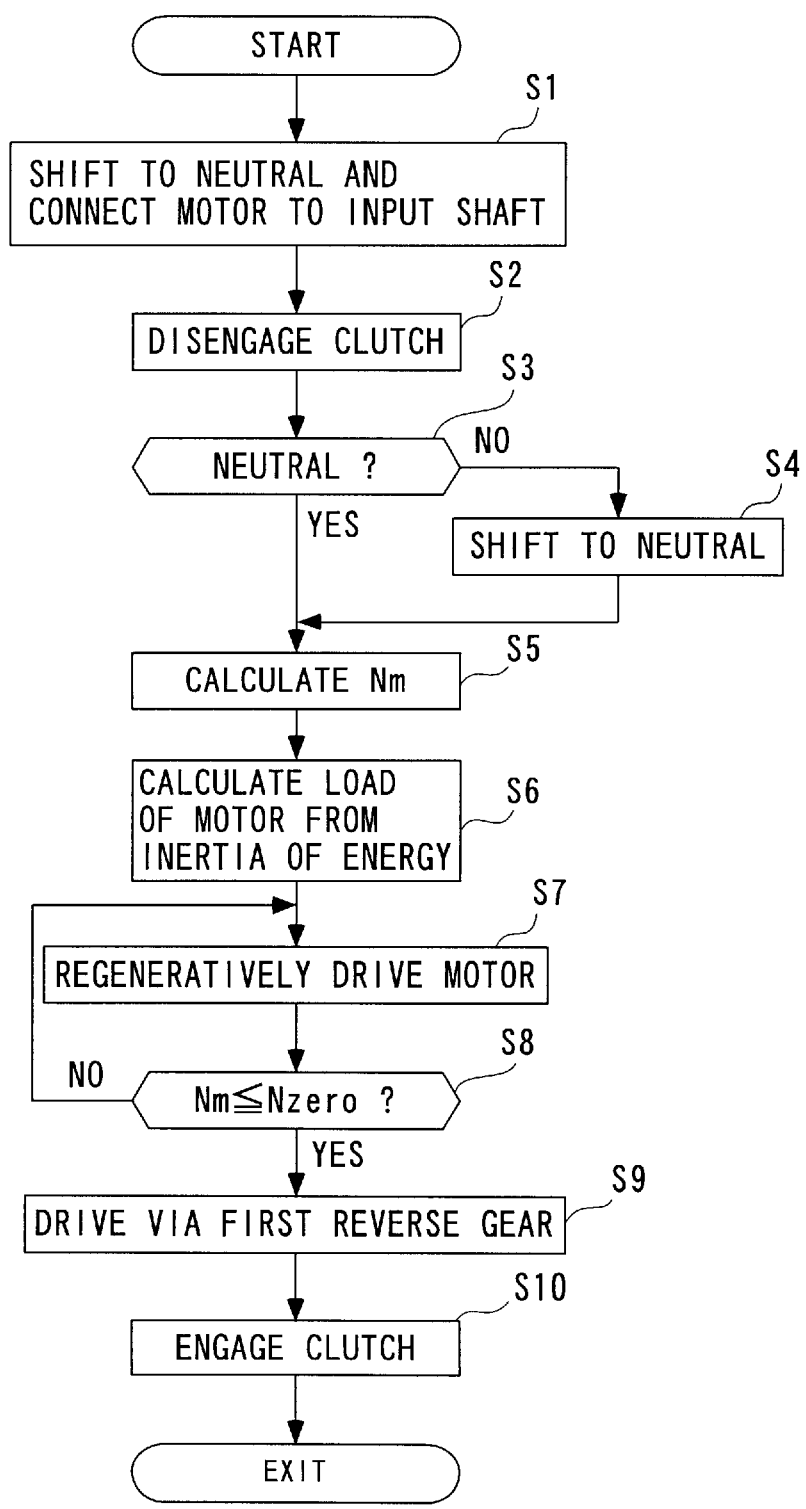
FIG. 6 is a flowchart showing the gear squeal prevention process.

Next, a gear squeal prevention process which is carried out when the vehicle traveling mode is shifted from a forward mode to a reverse mode will be described with reference to FIGS. 5 and 6. FIG. 6 is a flowchart showing the gear squeal prevention process. This process is executed when it is detected that the shift position of the shift lever 38 has been switched from a forward position to the reverse position, by the shift position signal from the shift position sensor 37. First, at a step S1, one of the actuators 31 to 33, which corresponds to a meshing one of forward gear pairs, is operated, whereby the input shaft 11 and the output shaft 12 are disconnected from each other, to switch the transmission 10 to neutral, and at the same time the switching actuator 35 is operated to thereby switch the connection mode of the motor 3 from the output shaft connection mode to the input shaft connection mode to couple the cranking drive shaft gear 9a to the drive shaft 3a. In short, the motor 3 is connected to the input shaft 11.

Next, the program proceeds to a step S2, wherein the clutch 5 is disengaged. Then, at a step S3, it is determined whether or not the transmission 10 is in neutral, in other words, whether or not the input shaft 11 and the output shaft 12 are connected to each other via any one of the forward first to fifth speed gear pairs 13 to 17. If the answer to the question of the step S3 is affirmative (YES), that is, if the input shaft 11 and the output shaft 12 are disconnected from each other, the program proceeds to a step S5, referred to hereinafter, whereas if the answer to the question of the step S3 is negative (NO), that is, if the transmission 10 is not in neutral, the program proceeds to a step S4, wherein similarly to the step S1, the transmission 10 is moved to neutral. It should be noted that since the transmission 10 has been moved to neutral at the step S1, the answer to the question of the step S3 is normally affirmative (YES).

Then, the program proceeds to the step S5, wherein an input shaft rotational speed Nm is calculated based on a signal generated by the input shaft rotational speed sensor 36. Next, at a step S6, the energy of inertia of the input shaft system including the input shaft 11 and the gears 13a to 17a is calculated based on the input shaft rotational speed Nm, and further the load of the motor 3 is calculated based on the calculated inertial energy.

Next, the program proceeds to a step S7, wherein the motor 3 is regeneratively driven in accordance with the load calculated at the step S6. Thus, as shown by an arrow with the wide line in FIG. 2 or 5, the torque of the input shaft 11 is transmitted to the motor 3, whereby power regeneration is carried out, and the input shaft 11 is decelerated by this power regeneration brake. This enables recovery of regenerative electric power.

Then, at a step S8, it is determined whether or not the input shaft rotational speed Nm is equal to or smaller than a predetermined value Nzero (e.g. 500 rpm). If the answer to the question of the step S8 is negative (NO), it is determined that the deceleration of the input shaft 11 is not sufficient, and the program returns to the step 7. On the other hand, if the answer to the question of the step S8 is affirmative (YES), it is determined that the input shaft 11 is decelerated sufficiently, the program proceeds to a step S9, wherein the reverse gear actuator 34 is driven, whereby the first reverse gear 19a is caused to slide from the release position to the meshing position, and mesh with the second and third reverse gears 19b, 19c simultaneously. Thus, the input shaft 11 and the output shaft 12 are connected to each other via the reverse gear train 19 in a state in which they rotate in reverse directions to each other. In this case, since the input shaft 11 and the output shaft 12 are connected to each other after the input shaft 11 is sufficiently decelerated, no gear squeal occurs. It should be noted that the motor 3 may be driven at the maximum rate of regeneration instead of executing the above-described steps S5 to S7. If the motor 3 is controlled in this manner, it is possible to further shorten a time period for decelerating the input shaft 11.

Next, the program proceeds to a step S10, wherein the clutch 5 is engaged, followed by terminating the program. As described hereinabove, the engine 2 is connected to the drive wheels 4, 4 via the input shaft 11, the reverse gear train 19, the output shaft 12, the differential 6, and so forth, whereby the vehicle can travel backward by the driving force from the engine 2 operated in response to the operation of an accelerator pedal, not shown.

On the other hand, when the vehicle is running in the forward fifth speed, if the motor 3 is in a cruising state (in which an engine rotational speed and engine output continue to exhibit approximately constant values within a predetermined range for a predetermined time period or longer), the connection mode of the motor is switched to the cut-off mode to operate the switching actuator 35 to thereby cause both the driving drive shaft gear 8a and the cranking drive shaft gear 9a to be disengaged from the drive shaft 3a such that they freely rotate about their axis. In short, the motor 3 is disconnected from the input shaft 11 and the output shaft 12. This makes it possible to prevent the motor 3 from offering an extra rotational resistance to the engine 2 when the vehicle is cruising. Although in the above example, the connection mode of the motor 3 is switched to the cut-off mode when the vehicle is cruising at the forward fifth speed, this is not limitative, but it may be switched to the cut-off mode when other switching conditions are fulfilled (e.g. when a predetermined operating condition of the engine is established during traveling of the vehicle in any of the forward first to fourth speeds).

Further, power regeneration by the motor 3 is carried out not only during the gear squeal prevention process described above, but also when power regeneration-executing conditions are satisfied. For instance, when the remaining amount of electric energy charged in a battery is small, and at the same time the vehicle is decelerating while traveling forward, power regeneration is executed by carrying out the same regenerative driving of the motor 3 as carried during the gear squeal prevention process.

As described hereinabove, according to the power transmission mechanism 1 of the present embodiment, the drive wheels 4, 4 can be driven by using the engine 2 or the motor 3 as the drive source. Further, when the idle running feeling-preventing process is carried out, the connection mode of the motor 3 is switched to the output shaft connection mode, and the engine 2 and the input shaft 11 are disconnected from each other by the clutch 5. In this state, the motor 3 and the drive wheels 4, 4 are connected via the synchro-clutch 23 by the switching actuator 35. Thus, even if the power transmission mechanism 1 undergoes a shifting operation during running of the vehicle, it becomes possible to prevent the idle running feeling from being caused due to temporary disconnection of the engine 3 from the drive wheels 4, 4. Further, when the engine 3 is started, the connection mode of the motor 3 is switched to the input shaft connection mode in which the drive shaft 3a of the motor 3 is connected to the input shaft 11 via the synchro-clutch 23 by the switching actuator 35, and at the same time the engine 2 and the input shaft 11 are connected to each other via the clutch 5 by the clutch actuator 30, whereby the motor 3 is connected to the engine 2. This enables the motor 3 to crank the engine 2. As described above, one motor 3 can be used as a drive source for driving the drive wheels and as a drive source for cranking the engine, which not only makes it possible to reduce manufacturing costs of the hybrid vehicle but also makes it easy to secure a space for mounting the transmission mechanism 1 in the hybrid vehicle.

Figure 9:
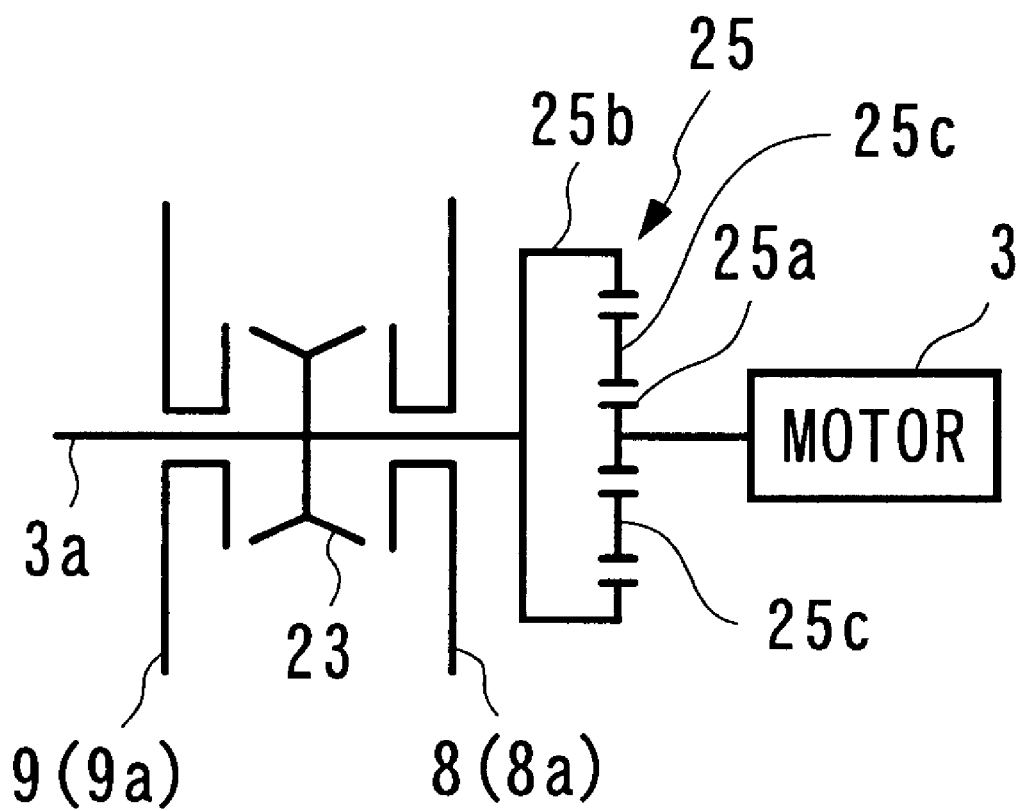
FIG. 9 is a diagram showing an example of connection in the power transmission mechanism, in which an electric motor and a drive shaft are coupled to each other through a planetary gear.

Further, the motor 3 has the driving drive shaft gear 8a or the cranking drive shaft gear 9a meshing with the driving output shaft gear 8b or the cranking input shaft gear 9b of the transmission 10, so that the gear ratio between an associated pair of them allows the motor 3 to drive the drive wheels 4, 4 with torque smaller than that of the conventional electric motor which is directly coupled to the output shaft of a transmission. This makes it possible to design the motor 3 compact in size, thereby making it easier to secure a mounting space of the power transmission mechanism in the vehicle. It should be noted that as shown in FIG. 9, the power transmission mechanism 1 may be configured such that the motor 3 and the drive shaft 3a are coupled through a planetary gear 25. In this example, the motor 3 is connected to a sun gear 25a of the planetary gear 25 while the drive shaft 3a is connected to a ring gear 25b of the planetary gear 25. The rotation of the motor 3 is transmitted to the drive shaft 3a while reducing the rotational speed of the motor 3 by the planetary gear 25 according to gear ratios between the sun gear 25a, a planetary pinion gear 25c, and the ring gear 25b. This enables the drive wheels 4, 4 to be driven with smaller torque, thereby making it possible to design the motor 3 compact in size.

Further, when the gear squeal prevention process is executed, the connection mode of the motor 3 is switched to the input shaft connection mode in which the engine 2 and the input shaft 11 are disconnected by the clutch 5, and at the same time the motor 3 is connected to the input shaft 11. This can reduce the rotational speed of the input shaft 11 in a relatively short time period by the regeneration operation of the motor 3, and cause the first reverse gear 19a in a stopped state to mesh with the second reverse gear 19b of the input shaft 11 which is sufficiently reduced in rotational speed, whereby it is possible to prevent occurrence of a gear squeal, and at the same time recover regenerative electric power. Further, when the vehicle is cruising, the connection mode of the motor 3 is switched to the cut-off mode in which the motor 3 is disconnected from both the input shaft 11 and the output shaft 12, whereby it is possible to prevent the motor 3 from offering an extra rotational resistance to the engine 2, thereby improving fuel economy.

Figure 7:
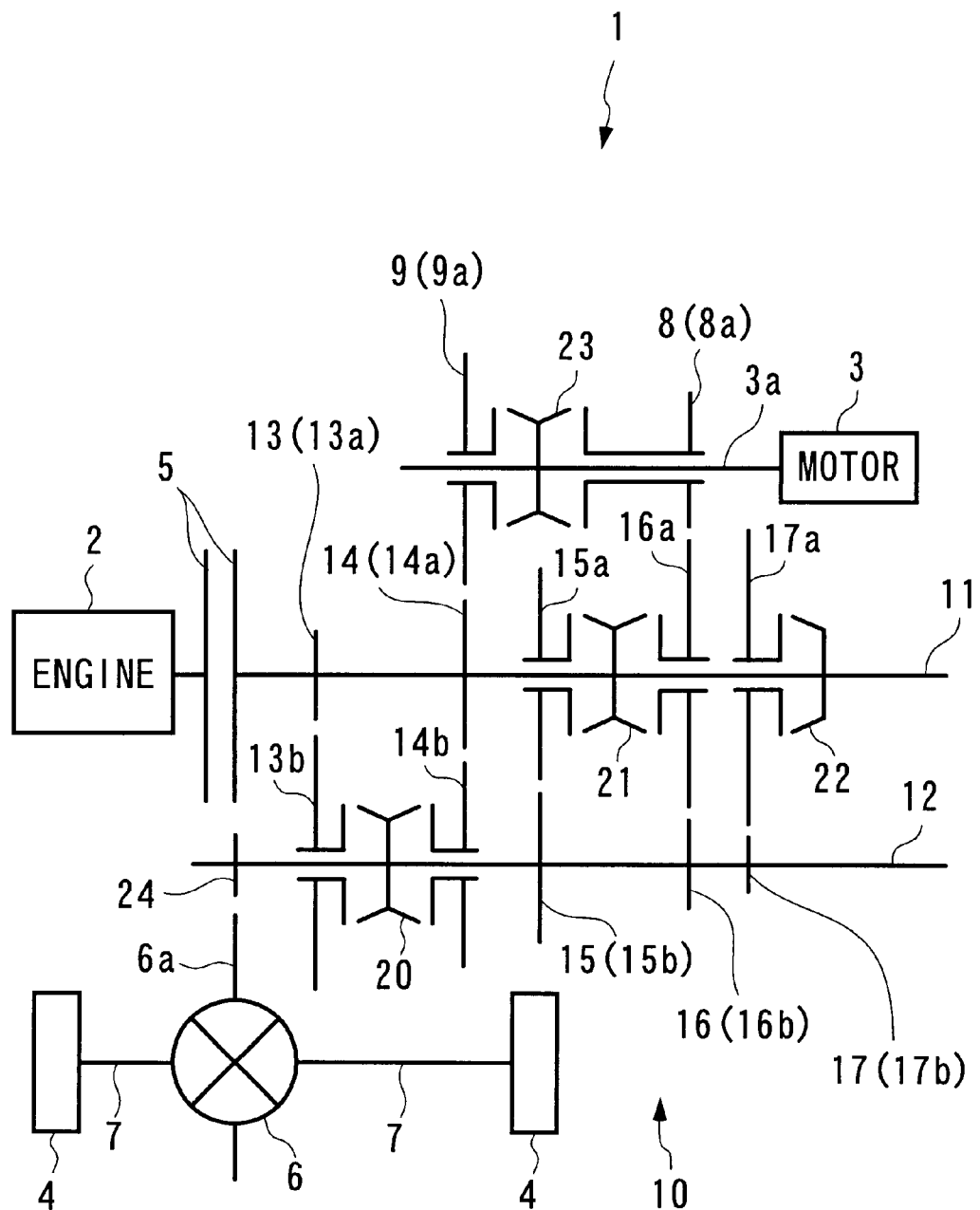
FIG. 7 is block diagram schematically showing the arrangement of a hybrid vehicle to which is applied a variation of the power transmission mechanism.

Next, a variation of the power transmission mechanism 1 will be described with reference to FIG. 7. As shown in the figure, this variation is distinguished from the power transmission mechanism 1 according to the above embodiment only in that the respective driving drive shaft gear 8a and cranking drive shaft gear 9a always mesh, not with the driving output shaft gear 8b and the cranking input shaft gear 9b, but with the input-side forward fourth speed gear 16a (input shaft idle gear) and the input-side forward second speed gear 14a (input shaft integrated gear), and the driving output shaft gear 8b and the cranking input shaft gear 9b are omitted.

According to the power transmission mechanism 1 configured as above, when the connection mode of the motor 3 is switched to the output shaft connection mode, the driving drive shaft gear 8a and the drive shaft 3a are connected to each other via the synchro-clutch 23 by the switching actuator 35, whereby the motor 3 is connected to the output shaft 12 via the driving drive shaft gear 8a, the input-side forward fourth speed gear 16a, and the output-side forward fourth speed gear 16b (output shaft gear). This permits the motor 3 to drive the drive wheels 4, 4. Further, when the connection mode is switched to the input shaft connection mode, the cranking drive shaft gear 9a and the drive shaft 3a are connected, whereby the motor 3 is connected to the input shaft 11 via the cranking drive shaft gear 9a and the input-side forward second speed gear 14a. Thus, the engine 2 can be cranked by the motor 3.

Further, it is possible to omit the driving output shaft gear 8b and cranking input shaft gear 9b of the power transmission mechanism 1 of the above embodiment, employ the input-side forward fourth speed gear 16a and input-side forward second speed gear 14a which are originally included in the transmission 10, and arrange the motor 3 and the drive shaft 3a in parallel with the input shaft 11 and the output shaft 12. Accordingly, the lengths of the input shaft 11 and the components associated therewith of the transmission 10 in the axial direction can be minimized as a whole, thereby ensuring excellent mounting performance of the hybrid vehicle. It should be noted that gears which mesh with the driving drive shaft gear 8a and the cranking drive shaft gear 9a, respectively, are not limited to those employed in this variation, but any suitable gears may be used so long as they provide the same advantageous effects as provided by the gears in this variation. For instance, the driving drive shaft gear 8a and the cranking drive shaft gear 9a may be caused to mesh with the input-side forward third speed gear 15a and the input-side forward first speed gear 13a, respectively.

Figure 8:
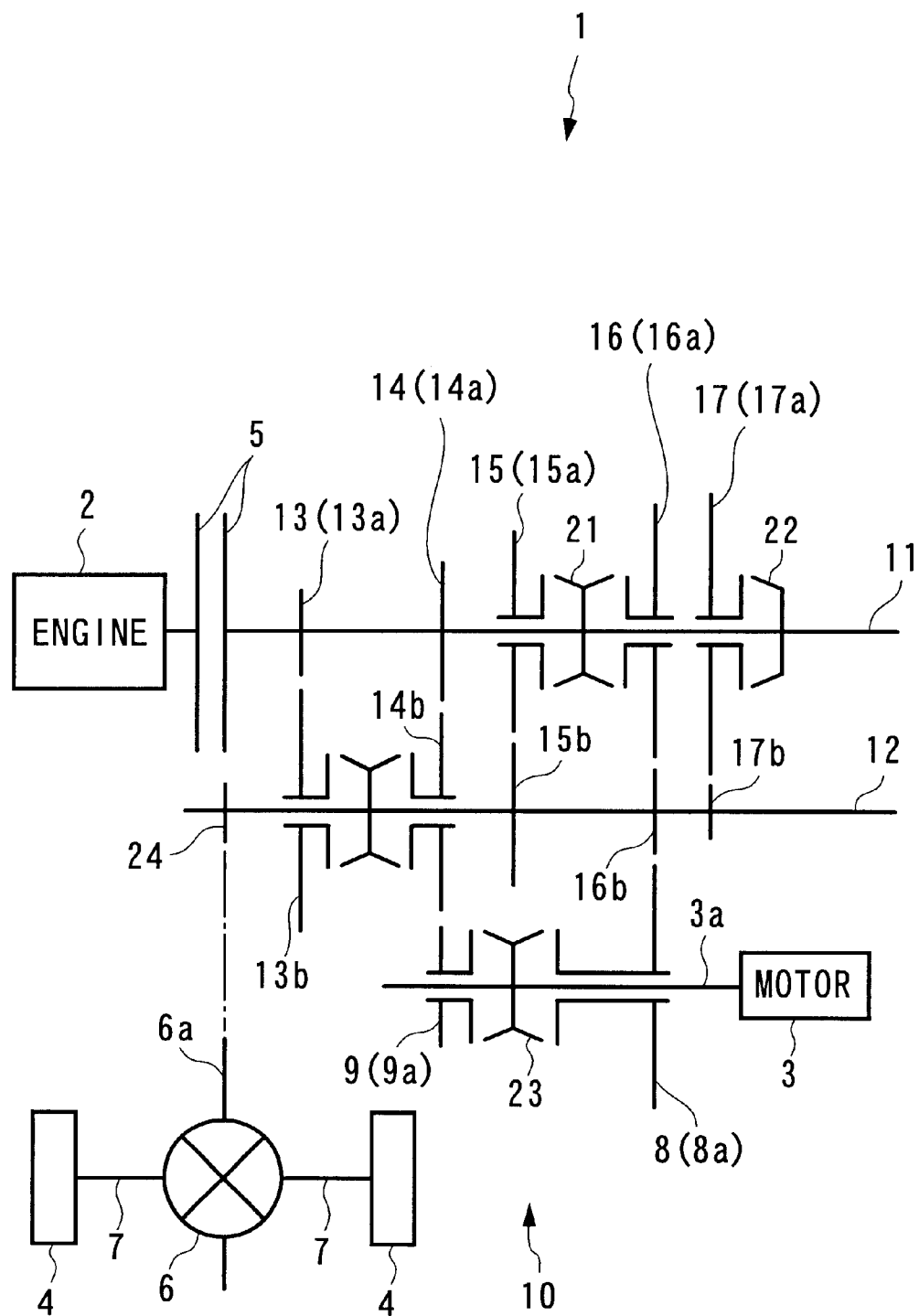
FIG. 8 is block diagram schematically showing the arrangement of a hybrid vehicle to which is applied another variation of the power transmission mechanism.

Then, another variation of the power transmission mechanism 1 will be described with reference to FIG. 8. As shown in the figure, this variation is distinguished from the above variation only in that the respective driving drive shaft gear 8a and cranking drive shaft gear 9a always mesh with the output-side forward fourth speed gear 16b (output shaft integrated gear) and the output-side forward second speed gear 14b (output shaft idle gear), in place of the input-side forward fourth speed gear 16a and the input-side forward second speed gear 14a. According to this power transmission mechanism 1, the same advantageous effects can be obtained as provided by the above variation.

Although in the above embodiment, to connect or disconnect the input shaft 11a or the output shaft 12a to or from the motor 3, the driving drive shaft gear 8a and the cranking drive shaft gear 9a, which are idle gears always meshing with associated ones of the change gears of the input shaft 11 and the output shaft 12, are connected to or disconnected from the drive shaft 3a by the synchro-clutch 23, this is not limitative, but the gear 8a or 9a may be disconnected from the drive shaft 3a by disengaging the gear 9a from the gear 9b or the gear 8a from the gear 8b, and may be connected by engaging the associated pair with each other again. In this case, it is only required, for instance, that the driving drive shaft gear 8a and the cranking drive shaft gear 9a slide along the direction of the axis of the drive shaft 3a, similarly to the first reverse gear 19a, such that the gear 8a or 9a can be engaged with and at the same time be disengaged from the driving output shaft gear 8b or the cranking input shaft gear 9b, respectively. Further, the power transmission mechanism 1 according to the invention can be applied not only to the hybrid vehicle used in the embodiment, which has the three change gear shafts 11, 12 and 18, but also to a hybrid vehicle which includes four or more change gear shafts. Further, in the example of the above embodiment, the motor 3 is used as the wheel-driving and engine-cranking drive source, but it may be also used as an auxiliary machine-driving motor for driving an air-conditioner compressor. Further, the drive shaft 3a is not limited to that arranged coaxially with the motor 3 so long as it is configured to be driven by the motor 3. For instance, the drive shaft 3a and the motor 3 may be located on axes different from each other and connected via gears.

It is further understood by those skilled in the art that the foregoing is a preferred embodiment of the invention, and that various changes and modifications may be made without departing from the spirit and scope thereof.

What is claimed is:

1. A power transmission mechanism that connects at least one of an engine and an electric motor to drive wheels, thereby transmitting a driving force from the at least one of the engine and the electric motor to the drive wheels, the power transmission mechanism comprising:

a multi-stage transmission including an input shaft connected to the engine and an output shaft connected to the drive wheels, said input shaft and said output shaft having a plurality of change gears arranged thereon which are selectively caused to mesh with each other, thereby transmitting the driving force from the engine to the drive wheels, such that a transmission gear ratio can be stepwise changed and at the same time said input shaft and said output shaft can be disconnected from each other, said multi-stage transmission having an input shaft gear and an output shaft gear on said input shaft and said output shaft, respectively;

a drive shaft driven by the electric motor;

a first gear and a second gear arranged on said drive shaft; and a switching mechanism for selectively switching a connection mode of the electric motor between an output shaft connection mode in which the electric motor is connected to said output shaft by meshing of said first gear with said output shaft gear, and an input shaft connection mode in which the electric motor is connected to said input shaft by meshing of said second gear with said input shaft gear.

2. A power transmission mechanism according to claim 1, wherein said input shaft gear is formed by an input shaft integrated gear integrally formed with said input shaft and an input shaft idle gear rotatable about said input shaft, said output shaft gear being integrally formed with said output shaft, said switching mechanism switching the connection mode of the electric motor to the output shaft connection mode by causing said first gear to mesh with said output shaft gear via said input shaft idle gear, and switching the connection mode to the input shaft connection mode by causing said second gear to mesh with said input shaft integrated gear.

3. A power transmission mechanism according to claim 1, wherein said input shaft gear is integrally formed with said input shaft, said output shaft gear being formed by an output shaft integrated gear integrally formed with said output shaft and an output shaft idle gear rotatable about said output shaft said switching mechanism switching the connection mode of the electric motor to the output shaft connection mode by causing said first gear to mesh with said output shaft integrated gear, and switching the connection mode to the input shaft connection mode by causing said second gear to mesh with said input shaft gear via said output shaft idle gear.

4. A power transmission mechanism according to claim 1, wherein said switching mechanism is capable of further switching the connection mode of the electric motor to a cut-off mode in which the electric motor is disconnected from both said output shaft and said input shaft.

5. A power transmission mechanism according to claim 1, wherein the electric motor is capable of performing regeneration operation, said transmission further including a reverse gear capable of simultaneously meshing with one of said change gears of said input shaft and one of said change gears of said output shaft, the transmission mechanism further including a clutch for disconnecting said transmission from the engine when said reverse gear simultaneously meshes with the one of said change gears of said input shaft and the one of said change gears of said output shaft, and wherein said switching mechanism switches the connection mode of the electric motor to the input shaft connection mode, in a state in which said transmission and the engine are disconnected from each other by said clutch.

* * * * *